Mar. 3, 1925.
R. G. TUGENDHAT
BAKING WAFERS AND THE LIKE
Filed Aug. 1, 1924
1,528,000
2 Sheets-Sheet 1
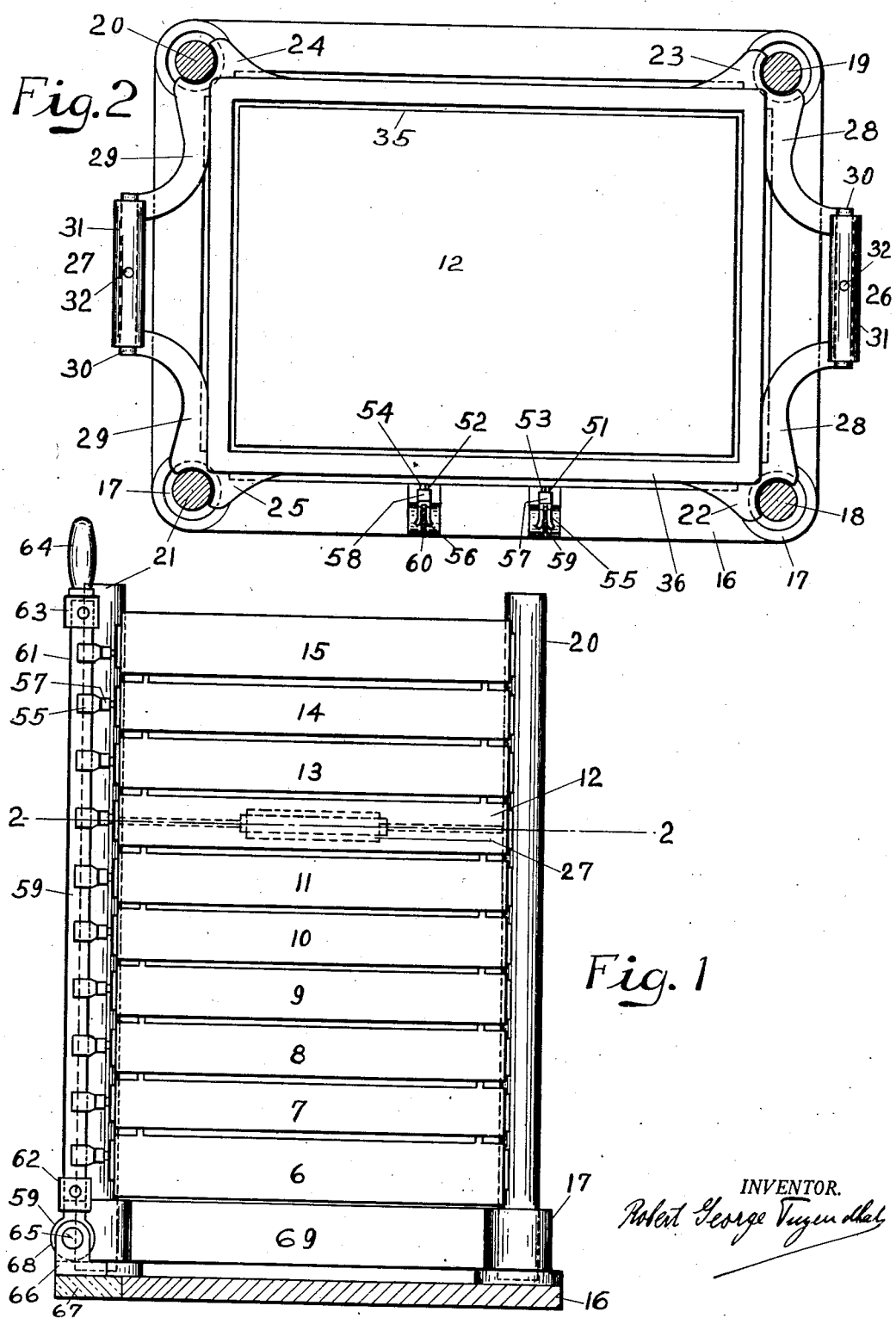
INVENTOR.
Robert George Tugendhat

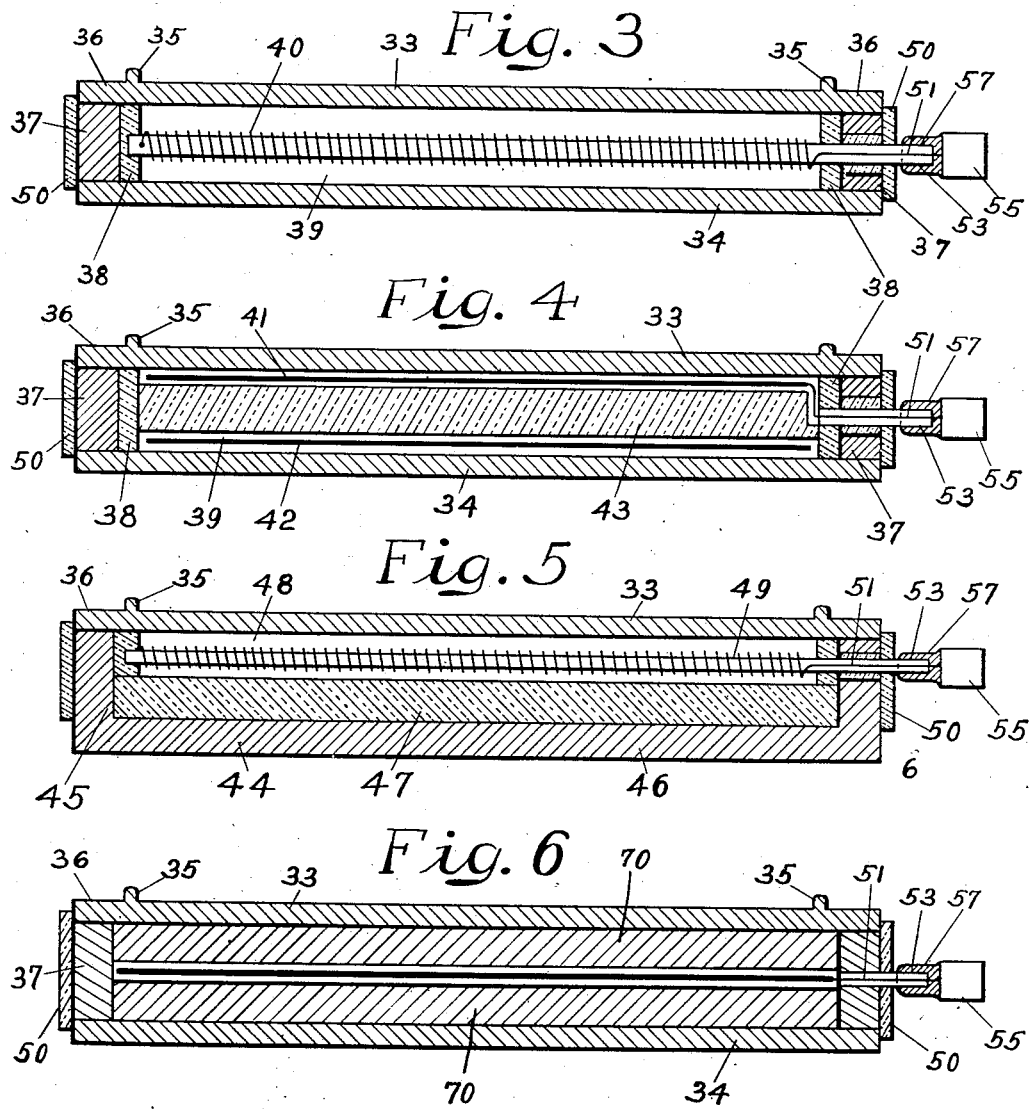

Patented Mar. 3, 1925.

1,528,000

UNITED STATES PATENT OFFICE.

ROBERT GEORGE TUGENDHAT, OF BRUNN, CZECHOSLOVAKIA.

BAKING WAFERS AND THE LIKE.

Application filed August 1, 1924. Serial No. 729,534.

*To all whom it may concern:*

Be it known that I, ROBERT GEORGE TUGENDHAT, a citizen of the Republic of Czechoslovakia, residing at Brunn, Czechoslovakia, have invented new and useful Improvements in Baking Wafers and the like, of which the following is a specification.

This invention relates to a method of and apparatus for baking wafers, biscuits, cakes and like articles and has for its object to save heat, to simplify the apparatus generally employed for this purpose, thereby saving a considerable amount of material in construction by the omission of parts hitherto deemed necessary, to curtail the space taken up by the apparatus and to reduce the labor and time necessary for its manipulation, all while performing the operation with the utmost efficiency and accuracy.

Articles like those mentioned above are at present generally baked in a single layer by means of two heaters or two sets of heaters, one arranged underneath the pan, plate or other contrivance carrying the raw mass, dough, batter or the like to be baked, and the second one above the same. According to my invention, I arrange the raw articles to be baked in a series of suitably distanced layers in superimposed position and place between two successive layers an electric heater or set of heaters, which thus give off their heat to and bake the bottom part of the upper layer and the top part of the lower layer of the pair, between which they are located. Thus, practically the whole amount of heat supplied is used for baking the articles, and the possible loss of heat is reduced to a minimum. The same quantity of material requires for being baked in my apparatus a considerably smaller amount of heat, than when being baked in any of the apparatus used hitherto, and the heating arrangement for the same may in consequence be of accordingly smaller power.

Most of the articles mentioned above are baked in pans provided with lids hinged to their lower parts, on which the raw mass dough, batter or the like to be baked is placed. No hinged lids are required in my apparatus; the bottom part of a pan used therein forms the lid of the top part of that one immediately beneath the same.

The invention is applicable to apparatus of any capacity and size, to those worked by hand and used for baking a comparatively small quantity of articles, as well as those worked by machinery and employed for mass production.

In order to explain more minutely those principles of construction which constitute the invention and which are clearly defined in the claims, an apparatus intended for baking wafers, biscuits or similar flat cakes and worked by hand, is represented, as example of the application of the invention, in the accompanying drawings, and described in the following paragraphs.

Fig. 1 shows in elevation the arrangement of the double-baking pans used in this kind of apparatus, their support and electric connections, and Fig. 2 is a cross section on line 2—2 of Fig. 1.

Figs. 3, 4 and 6 are vertical sections (on double the scale of Figs. 1 and 2), of various double-baking pans, showing the details of their construction, while Fig. 5 is a similar section of the bottom pan of the series.

In all the figures the same numerals of reference are used to indicate identical parts of the apparatus.

In Fig. 1 the numerals 6, 7, 8, 9, 10, 11, 12, 13, 14 and 15 indicate the ten superimposed oblong double-baking pans of the apparatus supported on the base plate 16. The latter is provided at its corners with the sockets 17, in which the vertical guide rods 18, 19, 20 and 21 are screwed or otherwise rigidly fixed. Brackets 22, 23, 24 and 25 having at their ends recesses corresponding to about half the circumference of the guide rods are arranged at the corners of each double-baking pan, the relative position of the guide rods and the brackets being such, that, when the pans are duly charged and held horizontally between the rods, the brackets slide loosely, but tightly on the latter. Each double-baking pan carries preferably at each of its shorter sides a suitable handle for its easy manipulation. The handles 26 and 27, shown in Fig. 2, consist of the flat projections 28 and 29 forming prolongations of the corresponding brackets 18 and 19, and 20 and 21 respectively, of the circular bar 30 connecting these projections, and of the wooden tube 31 provided with a slot wide enough for the projections 28 and 29 and kept in position on the bar 30 by a pin 32 or in any other suitable way.

Both the tops and bottoms of the pans 7, 8, 9, 10, 11, 12, 13 and 14 are constructed as baking plates; in Figs. 3, 4 and 6 the numeral 33 indicates the top and 34 the bottom plate of these pans. The upmost pan 15 and the lowest one 6 have only a single baking plate, pan 15 a plate like 34 for its bottom, and pan 6 a plate like 33 for its top, as shown for the latter in Fig. 5. The actual baking surface of the upper plates 33, on which the material to be baked is placed, is usually surrounded by an elevated border 35, especially if the material thereon is of a soft nature or, like batter, more or less liquid. In the double-baking pans the rims 36 of the baking plates 33 and 34, embracing their actual baking surface, are screwed or in any other suitable way rigidly attached to the oblong open frame 37 generally made of cast iron, with which the brackets 22, 23, 24 and 25, their projections 28 and 29 and the bars 30 are preferably made of one piece. The inner side of the frame 37 is insulated by a strip of asbestos board 38 preferably of such a thickness that the cavity 39 between the two baking plates extends only as far as their actual baking areas. The cavity 39 contains the electric heaters, which may be of any suitable kind and construction. The heaters may be arranged quite near to the baking plates, with only a mica sheet between, or they may be separated from the same by special metal plates for better distributing the heat supplied, or they may be surrounded with any other material suitable for the purpose of the case in hand. In Fig. 3 the heater of the double-baking plate consists of the ordinary type, a series of suitable insulating tubes surrounded by resistance wire and connected to each other as required for the purpose, and in Fig. 4 and Fig. 6 of the nichrome-ribbon or plate type. Fig. 4 shows two separate heaters of this kind, 41 for the upper baking plate 33, and 42 for the lower baking plate 34, between which a thick layer 43 of insulating material, asbestos board or the like, is arranged, each heater being separately controlled. This double-heating arrangement is especially advantageous in cases, where the nature of the material to be baked requires the supply of a different amount of heat to the top and bottom of the articles. In Fig. 6 a single nichrome plate is used as heater, embedded between two stout metal plates 70 for distributing the heat supplied most evenly to the baking plates 33 and 34.

Fig. 5 represents the baking pan 6 of Fig. 1, forming the bottom of the series, for which only a single baking plate 33 is required. Instead of an open frame, a boxlike structure 44 is used. To the top of its side walls 45 the plate 33 is fixed. Its bottom 46 is covered inside with insulating material 47, leaving above the same the cavity 48, in which the heater 49 is placed. The latter is represented as of the same type indicated by 40 in Fig. 3, but is smaller than the latter. The baking pan 15, forming the top of the series, has the same construction as the pan 6 with the exception, that its baking plate is like 34 shown in Fig. 3. The sides of all the pans are preferably—as far as it can conveniently be done—covered with insulating material 50.

The two ends of the heaters of all the pans are connected to conductors, 51 and 52, wire or ribbon, enclosed in porcelain or the like tubes 53 and 54, passing through openings in the asbestos lining 38, the frame 37 and the outside covering 50, and joined to the jaws 55 and 56 fastened by means of suitable sockets 57 and 58 on the ends of the tubes 53 and 54, and coacting with the blades 59 and 60 of the knife switch 61. The latter is of the usual construction and so arranged that by one turning movement of its blades, in accordance with the direction thereof, all the heaters of the superimposed series are at the same time either connected to or disconnected from the source of electricity. In Fig. 1 the blade 59 is shown in the position, when the heaters are connected to the current. The numerals 62 and 63 indicates the vulcanite cross bars connecting the two blades of the knife switch, and 64 its handle. The lower end of the blade 59, projecting below the bar 62, turns on the pin 65 between the jaws of the bracket 66 carrying the pin and fixed to the glass plate 67 rigidly fitted in a recess of the base plate 16.

The conductor 68 connects the blade 59 of the knife switch with the electric main. Between the sockets 17 at the corner of the base plate 16 a thick block 69 preferably of wood is arranged for the lowest pan 6 to rest on in an horizontal position.

The modus operandi of the apparatus is as follows:

First the pan 6 forming the lowest of the series is placed on the block 69 between the rods 18, 19, 20 and 21 and duly charged with the batter, dough or the like to be baked; then any of the double-baking pans 7—14 is placed on top of the pan 6, charged, and a second double-baking pan put on top of the same, which is then charged and covered by a third double-baking pan and so on, until all the eight double-baking pans of the series are in their proper position and contain the proper amount of the material to be baked. The pan 15, serving as lid, is then placed on top of the last double-baking pan of the series, and the blades of the knife switch 61 pushed between its jaws, whereby the electric current enters all the heaters of all the pans simultaneously, and the material is baked. After the time necessary for this purpose has elapsed, the knife switch 61 is opened, whereby the current to the heaters and the heat supply to the pans is immediately stopped. The pans are then taken one after the other from between the rods 18, 19, 20 and 21, and the baked articles removed therefrom.

I claim:

1. In a baking apparatus, the combination of a plurality of double-baking pans, each comprising an open frame, two baking plates fixed to the latter and covering the open sides thereof, an electric heater placed inside the cavity thus formed by the said frame and the said plates along the actual baking area of the latter, conductors leading electric current to the said heaters from a source outside of the said frame, and an elevated border surrounding the baking area of that baking plate which is to receive the material to be baked, of means for manipulating each of the said pans separately, of guides for arranging the same in superimposed position, and of means for connecting and disconnecting at will the conductors of the heaters of the said baking pans to the mains supplying the current.

2. In a baking apparatus, the combination of a plurality of double-baking pans, each comprising an open frame, two baking plates, fixed to the latter and covering the open sides thereof, two electric heaters one for each baking plate, separated from each other by insulating material and placed inside the cavity formed by the said frame and the said baking plates along the actual baking area of the latter, conductors leading electric current to each of the said heaters, and an elevated border surrounding the baking area of that baking plate which is to receive the material to be baked, of means for manipulating each of the said pans separately, of guides for arranging the said pans in superimposed position, and of means for connecting and disconnecting at will the conductors of the heaters of the said baking plates to the mains supplying the current.

3. A baking plate comprising a heating unit, and forming with its support a body, of which each the upper and lower side is one half of two successive containers in which the dough or the like is to be baked.

4. A baking plate forming with its topside the bottom and with its bottomside the top of each a container and having the heating unit in the middle.

5. A baking plate comprising a body and one or more heating units and having its top and bottom each formed to be either top or bottom of a container in which the dough or the like is to be baked.

6. An apparatus comprising a series of baking plates each having one or more heating units and forming with its top or bottomside with either the preceding or following plate a container in which the dough or the like is to be baked.

7. A baking plate comprising an electric heating element and forming with its support a body of which each the upper and lower side is one part of two successive containers in which the dough or the like is to be baked.

ROBERT GEORGE TUGENDHAT.